(12) United States Patent
Imamura

(10) Patent No.: US 9,754,361 B2
(45) Date of Patent: Sep. 5, 2017

(54) IMAGE PROCESSING APPARATUS AND ULTRASONIC DIAGNOSIS APPARATUS

(71) Applicant: Toshiba Medical Systems Corporation, Otawara-shi (JP)

(72) Inventor: Tomohisa Imamura, Nasushiobara (JP)

(73) Assignee: Toshiba Medical Systems Corporation, Otawara-shi (JP)

( * ) Notice: Subject to any disclaimer, the term of this patent is extended or adjusted under 35 U.S.C. 154(b) by 0 days.

(21) Appl. No.: 14/522,874

(22) Filed: Oct. 24, 2014

(65) Prior Publication Data

US 2015/0117741 A1 Apr. 30, 2015

(30) Foreign Application Priority Data

Oct. 25, 2013 (JP) ................................ 2013/222145

(51) Int. Cl.
*G06K 9/00* (2006.01)
*G06T 5/00* (2006.01)
(Continued)

(52) U.S. Cl.
CPC .............. *G06T 5/007* (2013.01); *G06T 5/10* (2013.01); *G06T 5/20* (2013.01);
(Continued)

(58) Field of Classification Search
None
See application file for complete search history.

(56) References Cited

U.S. PATENT DOCUMENTS 9,031,301 B2 * 5/2015 Imamura .................. A61B 6/00
382/131
2007/0223887 A1 * 9/2007 Kanamori ............. G06T 3/4053
386/232
(Continued)

FOREIGN PATENT DOCUMENTS

JP H9-44656 A 2/1997
JP H10-302052 A 11/1998
(Continued)

OTHER PUBLICATIONS

S. Du and R. Ward, "Wavelet-based illumination normalization for face recognition," in Proceedings of IEEE International Conference on Image Processing, vol. 2, 2005, pp. 11-954.*
(Continued)

*Primary Examiner* — Andrae S Allison
(74) *Attorney, Agent, or Firm* — Oblon, McClelland, Maier & Neustadt, L.L.P.

(57) ABSTRACT

The image processing apparatus of the embodiment comprises a multi-resolution decomposition part configured to repeatedly perform decomposition on a first image in which pixels thereof are arrayed in two-dimensional or three dimensional directions into high-frequency components and low-frequency components until the number of pixels becomes a predetermined number in each of the directions, and generate a second image based on the low-frequency components in a result of the last decomposition, an adjustment part configured to adjust the brightness of the second image, and a restoration part configured to generate a restored image having the same number of pixels as that of the first image in each of the directions using the brightness adjusted second image.

14 Claims, 12 Drawing Sheets

(51) Int. Cl.
*G06T 5/10* (2006.01)
*G06T 5/20* (2006.01)

(52) U.S. Cl.
CPC ............ *G06T 2207/10132* (2013.01); *G06T 2207/20016* (2013.01); *G06T 2207/20064* (2013.01)

(56) References Cited

U.S. PATENT DOCUMENTS

| | | | | |
|---|---|---|---|---|
| 2009/0088638 | A1* | 4/2009 | Sato | G06T 5/00 600/443 |
| 2009/0216124 | A1* | 8/2009 | Chono | A61B 8/08 600/443 |
| 2010/0228129 | A1* | 9/2010 | Osumi | A61B 8/14 600/443 |
| 2010/0286525 | A1* | 11/2010 | Osumi | A61B 8/14 600/443 |
| 2012/0035478 | A1* | 2/2012 | Nishihara | A61B 8/5269 600/443 |
| 2013/0158408 | A1* | 6/2013 | Tsuda | A61B 8/54 600/459 |
| 2013/0165788 | A1* | 6/2013 | Osumi | A61B 8/4444 600/443 |
| 2013/0237825 | A1* | 9/2013 | Sasaki | A61B 8/5269 600/443 |
| 2013/0281855 | A1* | 10/2013 | Baba | A61B 8/06 600/441 |
| 2014/0064590 | A1 | 3/2014 | Imamura et al. | |
| 2015/0222838 | A1* | 8/2015 | Kawabata | A61B 8/06 348/77 |

FOREIGN PATENT DOCUMENTS

| | | |
|---|---|---|
| JP | 2000-060849 A | 2/2000 |
| JP | 2006-41744 | 2/2006 |
| JP | 2007-117351 A | 5/2007 |
| JP | 2008-253379 A | 10/2008 |
| JP | 2009-039475 A | 2/2009 |
| JP | 2011-55415 | 3/2011 |
| JP | 2012-105973 | 6/2012 |
| JP | 2013-78569 | 5/2013 |
| WO | WO 2006/132014 A1 | 12/2006 |
| WO | WO 2013/042734 A1 | 3/2013 |

OTHER PUBLICATIONS

Office Action issued in Japanese Patent Application No. 2013-222145 dated Jun. 20, 2017.

* cited by examiner

FIG. 9

| FACTOR | UID | | ... | TEST SUBJECT | | ... |
| --- | --- | --- | --- | --- | --- | --- |
| | AAAAAAA | BBBBBBB | | CCC | DDD | |
| γ | 1.0 | 1.1 | ... | - | - | ... |
| δ | - | - | ... | 1.0 | 1.2 | ... |
| ε | 1.0 | 1.4 | ... | - | - | ... |
| η | - | - | ... | 1.0 | 1.5 | ... |

FIG. 11

| OPERATIONS / KINDS | BRIGHTNESS ADJUSTMENT 1 S104 | BRIGHTNESS UNIFORMIZATION S105 | BRIGHTNESS ADJUSTMENT 2 S106 |
|---|---|---|---|
| FIRST EMBODIMENT | O | O | O |
| SECOND EMBODIMENT | O | O | |
| | O | | O |
| | | O | O |
| THIRD EMBODIMENT | O | | |
| | | O | |
| | | | O |

IMAGE PROCESSING APPARATUS AND ULTRASONIC DIAGNOSIS APPARATUS

CROSS-REFERENCE TO RELATED APPLICATION

This application is based upon and claims the benefit of priority from Japanese Patent Application No. 2013-222145, filed Oct. 25, 2013; the entire contents of which are incorporated herein by reference.

FIELD

The embodiments of the present invention are related to image processing apparatuses and ultrasonic diagnosis apparatuses.

BACKGROUND

Modality, such as an ultrasonic diagnosis apparatus, an X-ray CT system, MRI equipment, and the like, is used to diagnose a test subject, and provides images thereof during the diagnosis.

For example, the ultrasonic diagnosis apparatus has widely spread through medical institutions since the apparatus gives noninvasive inspection in real time. The ultrasonic diagnosis apparatus includes an electro-acoustic transducer for irradiating ultrasonic pulses to the inside of the subject and an image processing apparatus. The ultrasonic pulses irradiated in the living body reflect in accordance with a difference in the specific acoustic impedance of the biological tissues. For example, a stronger ultrasonic echo can be obtained at a boundary surface where the impedance difference is large, and contrarily, a weaker ultrasonic echo can be obtained at a boundary surface where the impedance difference is small. The ultrasonic echo is converted to an electrical signal by the electro-acoustic transducer. The electrical signal is amplified, reconstructed into an ultrasonic b-mode image, or the like, and displayed on a display. When the image is displayed on the display, brightness modulation according to the signal amplitude is performed in such a manner that a larger ultrasonic echo would show up brighter and a smaller echo would show up darker on the display.

The image processing apparatus includes an adjustment part for amplifying the electrical signal. The adjustment part is provided with an operation part. Upon reception of an instruction by the operation part, the adjustment part amplifies (performs gain adjustment) the electrical signals to adjust the image brightness.

The details from the structures of low-frequency components, such as soft tissues, muscles, and the like, to the structures of high-frequency components, such as bones, and the like, are sometimes drawn on the image. Frequency processing for emphasizing dotted or liner shadows is performed for such the image.

Further, there is Japanese Unexamined Patent Application Publication No. 2012-105973, as a prior art document.

When the gain adjustment is set darker to a certain degree, it could lead to loss of necessary information for the image. On the other hand, there has been a request for adjusting the image brightness in real time. There also has been a request for easily adjusting the image brightness in accordance with a user and the test subject. Further, there has been another request for adjusting the image brightness of only the low-frequency components in the frequency processing.

However, when the gain adjustment is performed in two dimensions in space, it requires much time for the grain adjustment due to an enormous calculation quantity, and therefore it becomes difficult to adjust the image brightness in real time. It is also difficult to adjust the image brightness of only the low-frequency components in the frequency processing.

The present embodiments are intended to solve the above problems, and provide an image processing apparatus and an ultrasonic diagnosis apparatus, capable of adjusting image brightness in real time.

BRIEF DESCRIPTION OF THE DRAWINGS

FIG. 9 is a diagram illustrating corresponding relationships between a user and factors, and between a test subject and the factors.

FIG. 11 is a diagram illustrating corresponding relationships between kinds of embodiments and operations.

DETAILED DESCRIPTION

The image processing apparatus of the embodiment comprises a multi-resolution decomposition part configured to repeatedly perform decomposition on a first image in which pixels thereof are arrayed in two-dimensional or three dimensional directions into high-frequency components and low-frequency components until the number of pixels becomes a predetermined number in each of the directions, and generate a second image based on the low-frequency components in a result of the last decomposition, an adjustment part configured to adjust the brightness of the second image, and a restoration part configured to generate a restored image having the same number of pixels as that of the first image in each of the directions using the brightness adjusted second image.

(Original Image)

The modality diagnoses a test subject, and obtains an original image g of the test subject during the diagnosis. The original image g is an image in which pixels are arrayed in either two-dimensional or three-dimensional directions. The original image is an example of a first image.

The original image g in which m pieces of the pixels are arrayed in the two-dimensional directions is expressed as follows:

[Formula 1]

$$g = \begin{bmatrix} p_{11} & \cdots & p_{1m} \\ \vdots & \ddots & \vdots \\ p_{m1} & \cdots & p_{mm} \end{bmatrix} \quad (1)$$

In the original image g, $p_{ij}$ represents a pixel value (also called luminosity value or gray level) of a pixel. The subscripts "i" and "j" of the p respectively represent a row number (i=1, 2, . . . , m) and a column number (j=1, 2, . . . , m).

Hereinafter, a following embodiment of the image processing apparatus is described regarding the original image g as image in which 64 pieces (m=64) of the pixels are arrayed in the two-dimensional directions.

First Embodiment

A first embodiment of the image processing apparatus is described with reference to each figure.

Figure 1:
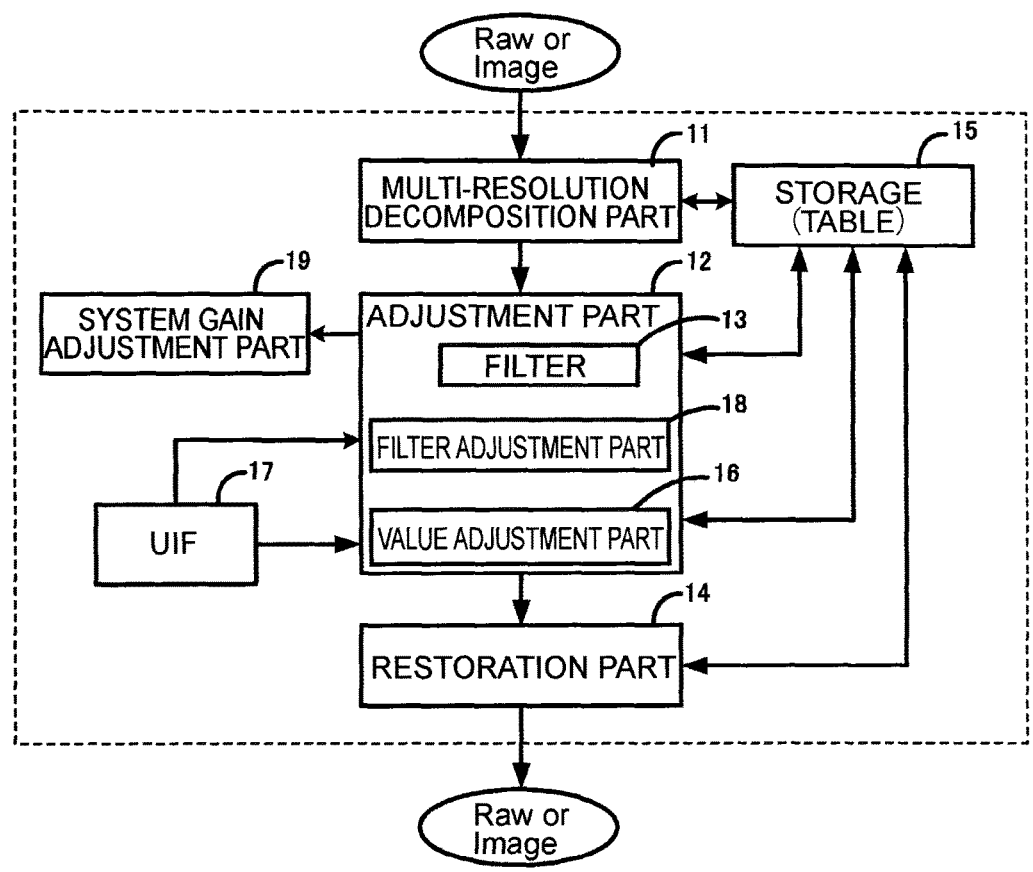
FIG. 1 is a configuration block diagram of an image processing apparatus according to a first embodiment.

Firstly, the basic configuration of the image processing apparatus is simply described with reference to FIG. 1 and FIG. 2. FIG. 1 is a configuration block diagram of an image processing apparatus 10.

As shown in FIG. 1, the image processing apparatus 10 includes a multi-resolution decomposition part 11, an adjustment part 12, a filter 13, a restoration part 14, a storage 15, a user interface (UIF) 17, and a system gain adjustment part 19.

[Multi-Resolution Decomposition Part 11]

Wavelet, Gaussian Pyramid, or the like, are used for multi-resolution analysis. Here, as an example, the multi-resolution decomposition part 11 which performs the multi-resolution analysis with Wavelet is described.

The multi-resolution decomposition part 11 decomposes the original image g into high-frequency components and low-frequency components by discrete wavelet transform. In the first embodiment, the discrete wavelet transform is repeatedly performed until the number of pixels in each direction reaches a predetermined number r.

The predetermined number r is 8 (r=8) in the first embodiment. Every time the discrete wavelet transform is performed, the number of pixels in each direction is cut in half (down sampling, described later) so that it is necessary for the discrete wavelet transform to be repeatedly performed the number of hierarchical level N (=3) times, in order to decrease the number of pixels in each direction from 64 pieces to 8 pieces.

Figure 2:
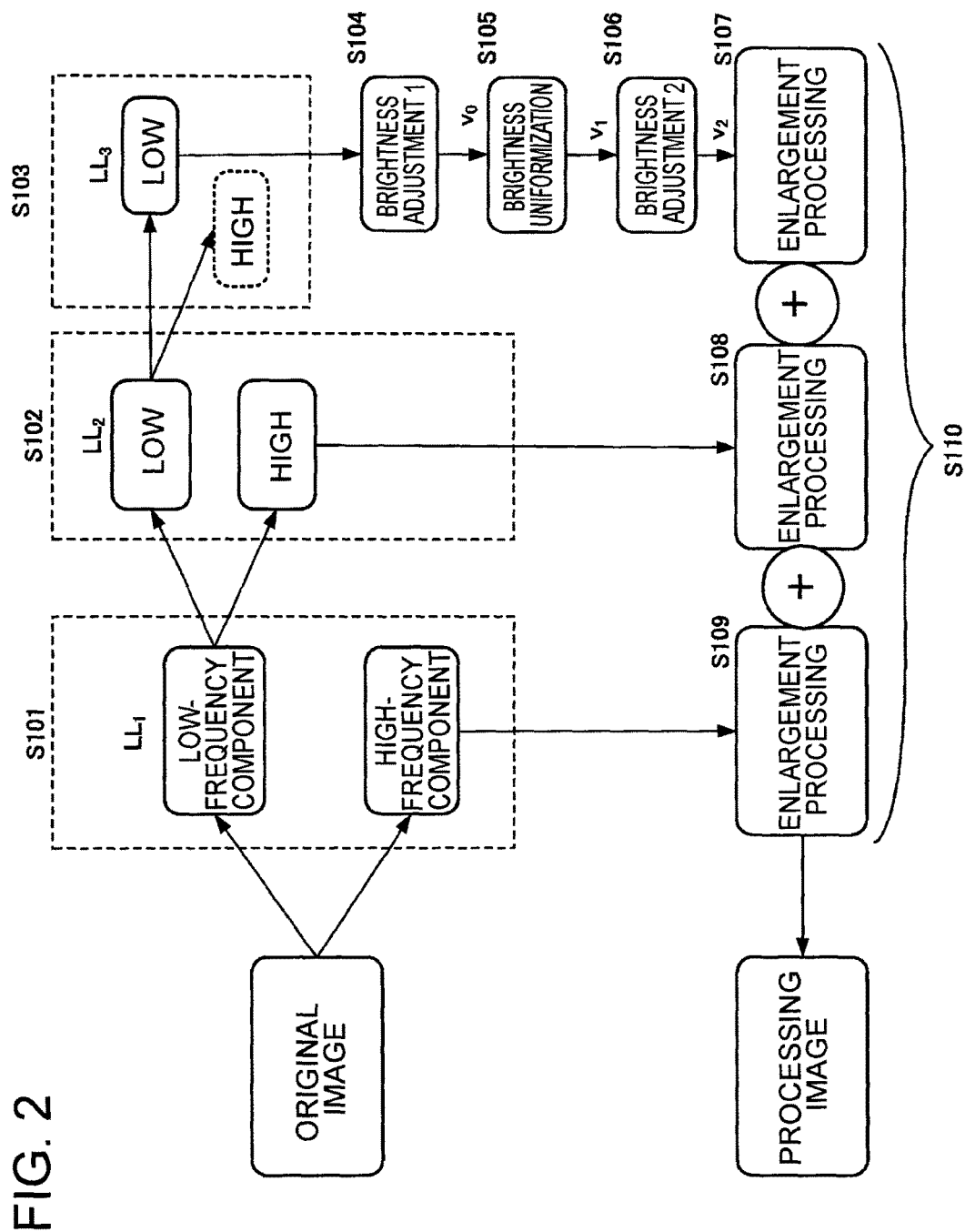
FIG. 2 is a flow chart illustrating a series of operation of the image processing apparatus.

FIG. 2 is a flow chart illustrating a series of operation of the image processing apparatus 10. In FIG. 2, the series of operation of the image processing apparatus 10 is illustrated in steps S101 to S110. It is assumed that the series of operation of the image processing apparatus 10 is automatically executed.

As shown in FIG. 2, in this example, the discrete wavelet transform in three hierarchical levels are performed in the series of operation of the image processing apparatus 10 (steps S101 to S103). The discrete wavelet transform in each of the hierarchical levels is illustrated by a part surrounded by a broken line in FIG. 2.

[Discrete Wavelet Transform in a First Hierarchical Level: Step S101]

Figure 3:
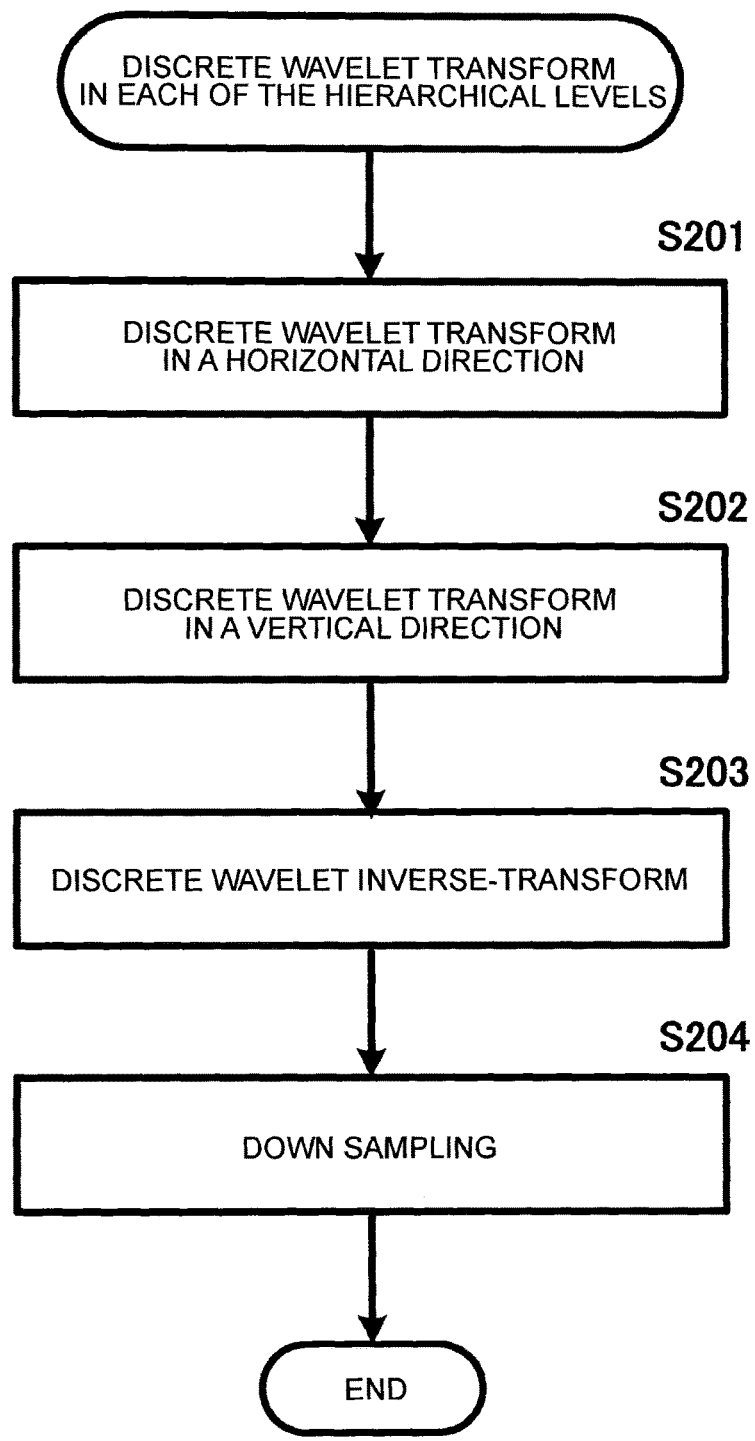
FIG. 3 is a flow chart illustrating a series of operation of discrete wavelet transform.

The discrete wavelet transform in a first hierarchical level is described with reference to FIG. 3. FIG. 3 is a flow chart illustrating the series of operation of the discrete wavelet (steps S201 to S204).

(Discrete Wavelet Transform in a Horizontal Direction: Step S201)

As shown in FIG. 3, the discrete wavelet transform is firstly performed for the original image g in a horizontal direction (row wise) (step S201).

F after the transformation when the discrete wavelet transform is performed in the horizontal direction (row wise) is expressed by the following formula:

[Formula 2]

$$F = C * g^t \quad (2)$$

wherein, $g^t$ represents a transposed matrix of g. Also, C represents a basis function (a square matrix).

The basis function C is expressed by the following formula:

[Formula 3]

$$CC^t = I \quad (3)$$

The original image g is decomposed into the high-frequency components and the low-frequency components in the discrete wavelet transform performed in the horizontal direction (row wise).

(Discrete Wavelet Transform in a Vertical Direction: Step S202)

The discrete wavelet transform is then performed for the F after the earlier transformation in a vertical direction (column wise) (step S202).

S after the transformation when the discrete wavelet transform is performed in the vertical direction (column wise) is expressed by the following formula:

[Formula 4]

$$S = C * F \quad (4)$$

The S after the transformation is configured with respective frequency components (low-frequency components both in the horizontal direction and the vertical direction; low-frequency components in the horizontal direction and high-frequency components in the vertical direction; high-frequency components in the horizontal direction and low-frequency components in the vertical direction; and high-frequency components both in the horizontal direction and the vertical direction).

(Discrete Wavelet Inverse-Transform: S203)

Discrete wavelet inverse-transform is then performed for the S after the transformation (S203).

The respective frequency components are transformed into an image $g^{(1)}$ by the discrete wavelet inverse-transform.

(Down Sampling: S204)

Next, the image $g^{(1)}$ is down sampled by half (S204). The array of pixels is down-sampled from m*m (64*64) to 32*32.

Figure 4:
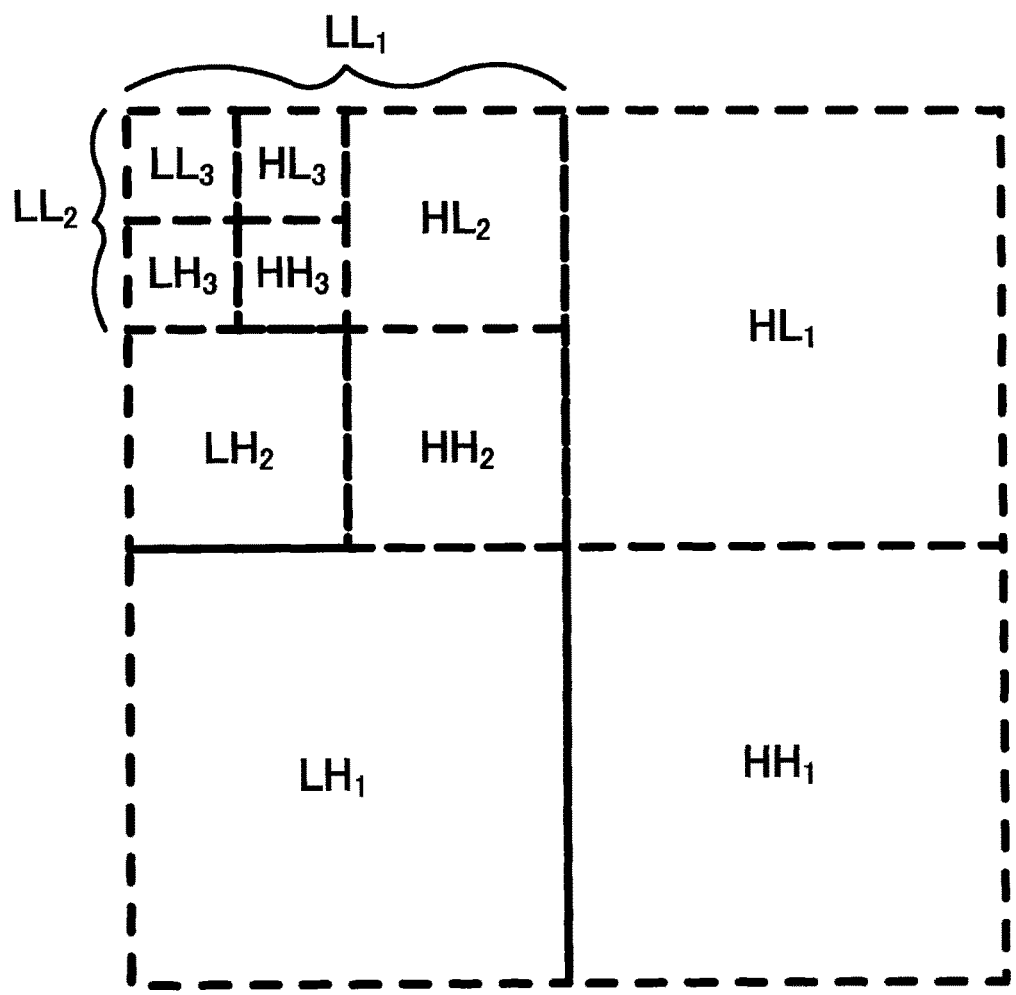
FIG. 4 is a diagram illustrating an example of the discrete wavelet transform performed up to the third hierarchical level.

FIG. 4 is a diagram illustrating an example of the discrete wavelet transform performed up to the third hierarchical level. In FIG. 4, in the image $g^{(1)}$, low-frequency components both in the horizontal direction and the vertical direction, a low-frequency component in the horizontal direction and a high-frequency component in the vertical direction, a high-frequency component in the horizontal direction and a low-frequency component in the vertical direction, and high-frequency components both in the horizontal direction and the vertical direction are respectively represented by "$LL_1$", "$LH_1$", "$HL_1$", and "$HH_1$". The subscription for H and L represents the number of hierarchical levels when transformed.

The respective frequency components in the image $g^{(1)}$ are expressed by the following formula:

[Formula 5]

$$g^{(1)}=(LL_1,LH_1,HL_1,HH_1) \quad (5)$$

Simple "low-frequency components" in the discrete wavelet transform in the first hierarchical level refer to low-frequency components both in the horizontal direction and the vertical direction, and other components refer to simply "high-frequency components" (the same shall apply in the discrete wavelet transform in a second and the following hierarchical levels).

The high-frequency components $LH_1$, $HL_1$, and $HH_1$ in the image $g^{(1)}$ are stored in the storage 15.

Figure 5:
FIG. 5 is a diagram illustrating a first high-frequency component.

FIG. 5 is a diagram illustrating a first high-frequency component. An example of the high-frequency component in the image $g^{(1)}$ is illustrated in FIG. 5.

[Discrete Wavelet Transform in the Second Hierarchical Level: Step S102]

The discrete wavelet transform in the second hierarchical level is similarly performed as the discrete wavelet transform in the first hierarchical level; the description thereof is therefore omitted.

Due to the discrete wavelet transform in the second hierarchical level, the low-frequency component $LL_1$ in the image $g^{(1)}$ is decomposed into respective frequency components (low-frequency components both in the horizontal direction and the vertical direction; a low-frequency component in the horizontal direction and a high-frequency component in the vertical direction; a high-frequency component in the horizontal direction and a low-frequency component in the vertical direction; and high-frequency components both in the horizontal direction and the vertical direction).

In FIG. 4, in an image $g^{(2)}$, low-frequency components both in the horizontal direction and the vertical direction, a low-frequency component in the horizontal direction and a high-frequency component in the vertical direction, a high-frequency component in the horizontal direction and a low-frequency component in the vertical direction, and high-frequency components both in the horizontal direction and the vertical direction are respectively represented by "$LL_2$", "$LH_2$", "$HL_2$", and "$HH_2$".

The respective frequency components in the image $g^{(2)}$ are expressed by the following formula:

[Formula 6]

$$g^{(2)}=(LL_2,LH_2,HL_2,HH_2) \quad (6)$$

In the discrete wavelet transform in the second hierarchical level, the array of pixels is down-sampled from 32*32 to 16*16.

The high-frequency components $LH_2$, $HL_2$, and $HH_2$ are stored in the storage 15.

Figure 6:
FIG. 6 is a diagram illustrating a second high-frequency component.

FIG. 6 is a diagram illustrating a second high-frequency component. An example of the high-frequency component in the image $g^{(2)}$ is illustrated in FIG. 6.

[Discrete Wavelet Transform in the Third Hierarchical Level: Step S103]

The discrete wavelet transform in the third hierarchical level is similarly performed as the discrete wavelet transform in the first hierarchical level; the description thereof is therefore omitted.

Due to the discrete wavelet transform in the third hierarchical level, the low-frequency component $LL_2$ in the image $g^{(2)}$ is decomposed into respective frequency components (low-frequency components both in the horizontal direction and the vertical direction; a low-frequency component in the horizontal direction and a high-frequency component in the vertical direction; a high-frequency component in the horizontal direction and a low-frequency component in the vertical direction; and high-frequency components both in the horizontal direction and the vertical direction).

In FIG. 4, in an image $g^{(3)}$, low-frequency components both in the horizontal direction and the vertical direction, a low-frequency component in the horizontal direction and a high-frequency component in the vertical direction, a high-frequency component in the horizontal direction and a low-frequency component in the vertical direction, and high-frequency components both in the horizontal direction and the vertical direction are respectively represented by "$LL_3$", "$LH_3$", "$HL_3$", and "$HH_3$".

The respective frequency components in the image $g^{(3)}$ are expressed by the following formula:

[Formula 7]

$$g^{(3)}=(LL_3,LH_3,HL_3,HH_3) \quad (7)$$

In the discrete wavelet transform in the third hierarchical level, the array of pixel values is down-sampled from 16*16 to 8*8. That is, the number of pixel pieces arrayed in each direction equals to 8 of the predetermined number (r=8). Thus, the repetition of the discrete wavelet transform is terminated at the third hierarchical level. The image $g^{(3)}$ becomes image of a lowest hierarchical level. The low-frequency component $LL_3$ in the image $g^{(3)}$ becomes a next subject to be adjusted by the adjustment part 12. Here, the "image of a lowest hierarchical level" refers to an image obtained when the last repetition is terminated when the discrete wavelet transform is repeatedly performed the predetermined number of hierarchical level times. The image of the lowest hierarchical level is an example of a second image.

Figure 7:
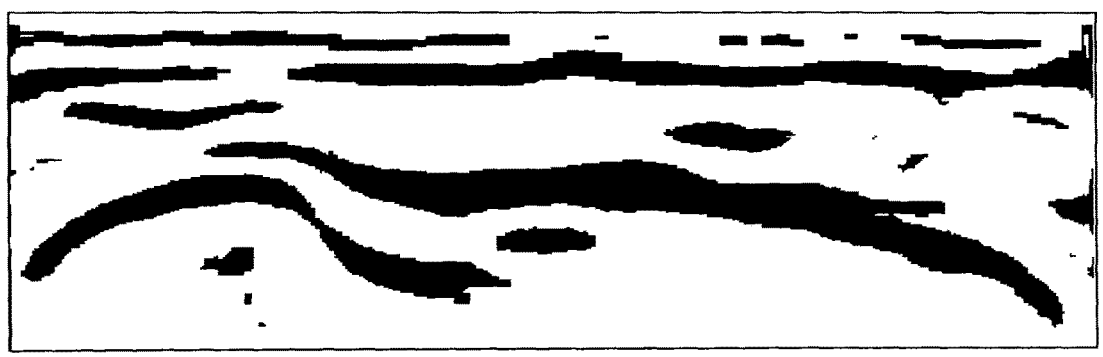
FIG. 7 is a diagram illustrating a third high-frequency component.
Figure 8:
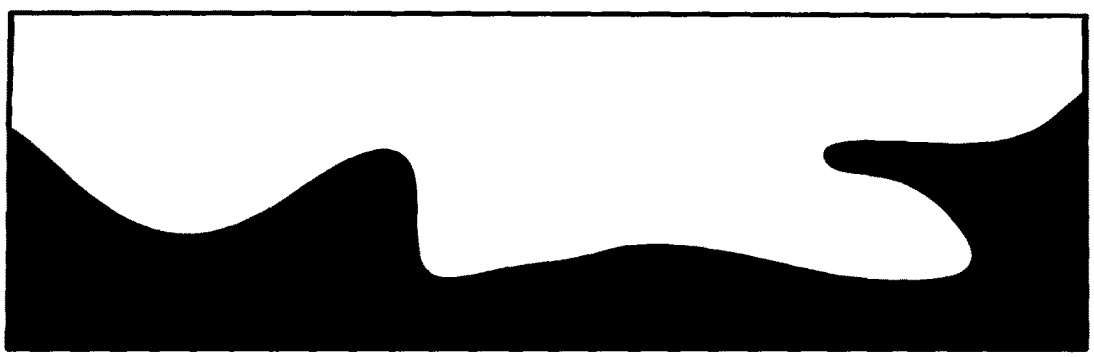
FIG. 8 is a diagram illustrating a low-frequency component at image of a lowest hierarchical level.

FIG. 7 is a diagram illustrating a third high-frequency component. An example of the high-frequency component in the image $g^{(3)}$ is illustrated in FIG. 7. Further, FIG. 8 is a diagram illustrating a low-frequency component in the image in the lowest hierarchical level. An example of the low-frequency component in the image $g^{(3)}$ is illustrated in FIG. 8.

[Brightness Adjustment 1 by the Adjustment Part 12]

The low-frequency component in the image $g^{(3)}$ of the lowest hierarchical level is represented by $LL_3$. Here, it is assumed that the pixel value of the image in the image $g^{(3)}$ of the lowest hierarchical level is also represented by "$LL_3$". The pixel values $LL_3$ of the image in the image $g^{(3)}$ of the lowest hierarchical level is arrayed in 8*8.

The adjustment part 12 changes the pixel values $LL_3$ by multiplying the pixel values $LL_3$ of the image in the image $g^{(3)}$ by a factor α (step S104 illustrated in FIG. 2; brightness adjustment 1). When the changed pixel values $LL_3$ is set as a predetermined value $v_0$, the predetermined value $v_0$ is expressed as follows:

[Formula 8]

$$v_0 = \alpha * LL_3 \quad (8)$$

The predetermined value $v_0$ also has a pixel array of 8*8.

[Filter 13]

The filter 13 makes the brightness of the predetermined value $v_0$ (the pixel values of the pixels arrayed in 8*8) uniform by performing sfumato processing (step S105 illustrated in FIG. 2; brightness uniformization). Here, the "making the brightness uniform" or "brightness uniformization" refers to reducing a change in brightness.

In the sfumato processing, it is avoided that the calculation quantity from being huge since the predetermined value $v_0$ is simply determined from the pixel values of the pixels arrayed in 8*8.

Weighting factors of a smoothed filter is one of the examples of the sfumato processing. As the smoothed filter, for example, a moving average filter (it is also called an averaging filter), a Gaussian filter, or a median filter is used.

In order to calculate the pixel values of the subject pixels (the pixels arrayed in 8*8), the moving average filter uses the adjacent pixels thereto.

The moving average filter having a filter size of 3*3 is as follows:

$$\frac{1}{9}\begin{bmatrix} w_{11} & w_{12} & w_{13} \\ w_{21} & w_{22} & w_{23} \\ w_{31} & w_{32} & w_{33} \end{bmatrix}$$

wherein, "w" represents a weighting factor, and the subscriptions of w represent a row number and a column number.

As an example of the moving average filter having the filter size of 3*3, in order to calculate the pixel values of the subject pixels, the pixel values of the 8 pixels adjacent thereto are used, and it is assumed that the sum of the weights w is 1 and each of the weights w is ⅑.

The predetermined value $v_0$ (the pixel values of the pixels arrayed in 8*8) of the subject for the brightness uniformization is as follows:

$$v_0 = \begin{bmatrix} q_{11} & \cdots & q_{18} \\ \vdots & \ddots & \vdots \\ q_{81} & \cdots & q_{88} \end{bmatrix}$$

For the predetermined value $v_0$, each of the pixel values of the pixels arrayed in 8*8 is represented by $q_{ij}$. The subscripts "i" and "j" of the q respectively represent the row number (i=1, 2, . . . , 8) and the column number (j=1, 2, . . . , 8).

The moving average filter having the weight w=⅑ and the filter size of 3*3 is used for the brightness uniformization. In this case, for example, in the predetermined value $v_0$ (the pixel values of the pixels arrayed in 8*8) of the subject, the pixel value $q_{33}$ of the pixel arranged at the position where the row number is 3 and the column number is 3 is expressed as follows:

$$q'_{33}=(q_{22}+q_{23}+ \ldots +q_{33}+ \ldots +q_{43}+q_{44})/9$$

Here $p'_{33}$ is the changed value of the pixel value $q_{33}$ by being subjected to the sfumato processing by the filter 13.

As described above, the predetermined value $v_0$ is changed to $v_2$, and the brightness of the image of the lowest hierarchical level is made uniform by sfumato processing by the filter 13.

The changed value $v_1$ is expressed by the following formula:

[Formula 9]

$$v_1=\beta*v_0 \quad (9)$$

β corresponds to a value indicating the filter size and the weight. It is avoided the calculation quantity from being huge since the value $v_1$ is simply determined from the predetermined value $v_0$ where the pixel values of the pixels are arrayed in 8*8.

The moving average filter is not limited to the filter having the filter size of 3*3. For example, the filter having the filter size of n (≥4)*n may be used to make the brightness uniform even more. Further, the filter 13 is not limited to the moving average filter but may be other smoothed filter.

The following configuration may be applied. Those filters 13 are stored in the storage 15 in advance in association with the user and the test subject. Upon reception of the information of the user and the test subject, the image processing apparatus 10 may use the filters corresponding to the user, and the like, to perform the sfumato processing. The sfumato processing is performed by a filter adjustment part 18 in response to an operation by a UIF 17.

[Brightness Adjustment 2 by the Adjustment Part 12]

The adjustment part 12 adjusts the value $v_1$ (the pixel values of the pixels arrayed in 8*8) changed by the filter 13 to a value $v_2$ by multiplying/dividing the value $v_1$ by an offset value or a correction factor (step S106 illustrated in FIG. 2; brightness adjustment 2). The adjusted value $v_2$ is expressed by the following formula:

[Formula 10]

$$v_2=k_0*v_1+\alpha_0 \quad (10)$$

wherein, $k_0$ is an initial value of the correction factor and $a_0$ is an initial value of the offset value.

The initial values $k_0$ and $a_0$ are stored in the storage 15 in advance in association with the user and the test subject.

FIG. 9 is a diagram illustrating corresponding relationships between the user and the factors, and between the test subject and the factors. The factors to be multiplied by the initial values $k_0$ and $a_0$ are shown in FIG. 9 in association with the user and the test subject. The factors to be multiplied by the initial values $k_0$ and $a_0$ are stored in the storage 15. The adjustment part 12 refers to the factors associated the user and the test subject to adjust the value $v_1$ to the value $v_2$, based on the initial values $k_0$ and $a_0$ read out from the storage 15 and the factors, which to be multiplied by the initial values, read out from the storage 15.

In this case, the value $v_2$ is expressed by the following formula:

[Formula 11]

$$v_2=\gamma*\delta*k_0*v_1+\epsilon*\eta*\alpha_0 \quad (11)$$

wherein, γ and ε are the factors to be multiplied by the initial values $k_0$ and $a_0$ and associated with the user. Further, δ and η are the factors to be multiplied by the initial values $k_0$ and $a_0$ and associated with the test subject.

As shown in FIG. 9, when the user identification number (UID) is "AAAAAAAA", the factors to be multiplied by the initial values $k_0$ and $a_0$ are respectively "1.0", and "1.0". When the UID is "BBBBBBBB", the factors are respectively "1.1", and "1.4". Further, when the test subject is "CCC", the factors are respectively "1.0", and "1.0". Furthermore, when the test subject is "DDD", the factors are respectively "1.2", and "1.5".

For example, when the UID is "BBBBBBBB" and the test subject is "DDD", the adjusted value $v_2$ is expressed by the following formula:

[Formula 12]

$$v_2=1.1*1.2*k_0*v_1+1.4*1.5*\alpha_0 \quad (12)$$

As described above, the adjustment part 12 refers to the initial values $k_0$ and $a_0$ and the factors to be multiplied thereby, and adjusts the value $v_1$ (the pixel values of the pixels arrayed in 8*8) changed by the filter 13 to the value $v_2$ associated to the user and the test subject, in accordance with the formula (11).

Further, the adjustment part 12 is configured to be able to adjust the value $v_2$. The adjustment of the value $v_2$ may be performed directly for the adjusted value $v_2$, or performed indirectly by changing the initial values $k_0$ and $a_0$, and the factors to be multiplied thereby. The change of the value $v_2$, the initial values $k_0$ and $a_0$, and the factors is performed by a value adjustment part 16, in response to an operation by the user interface (UIF) 17.

In the first embodiment, the brightness adjustment 2 (step S106) is performed after the brightness uniformization process (step S105); however, the order of the operations may be reversed.

[The Restoration Part 14]

The restoration part 14 performs up-sampling the brightness adjusted image (8*8 image) of the lowest hierarchical level in the low-frequency components in which 8 pixels are arrayed in each direction to the same size as the original image (64*64 image) in which 64 pixels are arrayed in each direction (step S107 illustrated in FIG. 2; enlargement processing). The image subjected to the up-sampling is set as an image $g^{(4)}$. In the up-sampling, the numbers of the pixels are simply multiplied by 8 in the two-dimensional directions of the horizontal and vertical directions; therefore it is possible to do the calculation in a short time. Here, the "enlargement processing" refers to return the number of the pixels in each direction in the subject image to the number of the pixels in the original image. Hereinafter, the same applies to the enlargement processing to be performed in steps S108 and S109.

An image of high-frequency components is used to generate a restored image. Here, the image of high-frequency components is the image, as described above, having frequency components ($LH_1$, $HL_1$, and $HH_1$, as well as $LH_2$, $HL_2$, and $HH_2$) other than low-frequency components ($LL_1$, and $LL_2$) both in the horizontal direction and the vertical direction.

The restoration part 14 performs the up-sampling for the images (the images of 16*16) of the high-frequency components $LH_2$, $HL_2$, and $HH_2$ stored in the storage 15 to the same size of the original images thereof (the images of 64*64), respectively (step S108 illustrated in FIG. 2; the enlargement processing). The image subjected to the up-sampling is set as an image $g^{(5)}$. In the up-sampling, the numbers of the pixels are simply multiplied by 4 in the two-dimensional directions of the horizontal and vertical directions; therefore it is possible to do the calculation in a short time.

Further, the restoration part 14 performs the up-sampling the images (the images of 32*32) of the high-frequency components $LH_1$, $HL_1$, and $HH_1$ stored in the storage 15 to the same size of the original images (the images of 64*64), respectively (step S109 illustrated in FIG. 2; the enlargement processing). The image subjected to the up-sampling is set as an image $g^{(6)}$. In the up-sampling, the numbers of the pixels are simply multiplied by 2 in the two-dimensional directions of the horizontal and vertical directions; therefore it is possible to do the calculation in a short time.

The restoration part 14 adds the up-sampled images $g^{(4)}$, $g^{(5)}$, and $g^{(6)}$ to restore an image $g^{(n)}$ (step S110 illustrated in FIG. 2; addition processing).

The restored image $g^{(n)}$ is expressed by the following formula:

[Formula 13]

$$g^{(n)} = g^{(4)} + g^{(5)} + g^{(6)} \quad (13)$$

The images $g^{(4)}$, $g^{(5)}$, and $g^{(6)}$ of 64*64 pixels are simply added to restore the image $g^{(n)}$; therefore it dose not require much time for the calculation.

In the first embodiment, the case that both of the images $g^{(5)}$ and $g^{(6)}$ are added to the image $g^{(4)}$ by the restoration part 14 is described; however, either one of the images may be added.

Further, in the first embodiment, the brightness is uniformed by the filter 13 (step S105), and the brightness adjustment 2 is then performed (step S106). However, the brightness adjustment 2 may be performed before making the brightness uniform.

According to the first embodiment, even the high-frequency component structure, such as bones, and the low-frequency component structure, such as soft tissues, are mixingly present, the bone brightness and the soft tissue brightness can be automatically adjusted to a level close to each other in real time, and it can save time and labor of the gain adjustment, without changing any structures. Further, in cardiac testing, noise components (high-frequency components) of other than the cardiac muscles can also be displayed dark.

Second Embodiment

Figure 10:
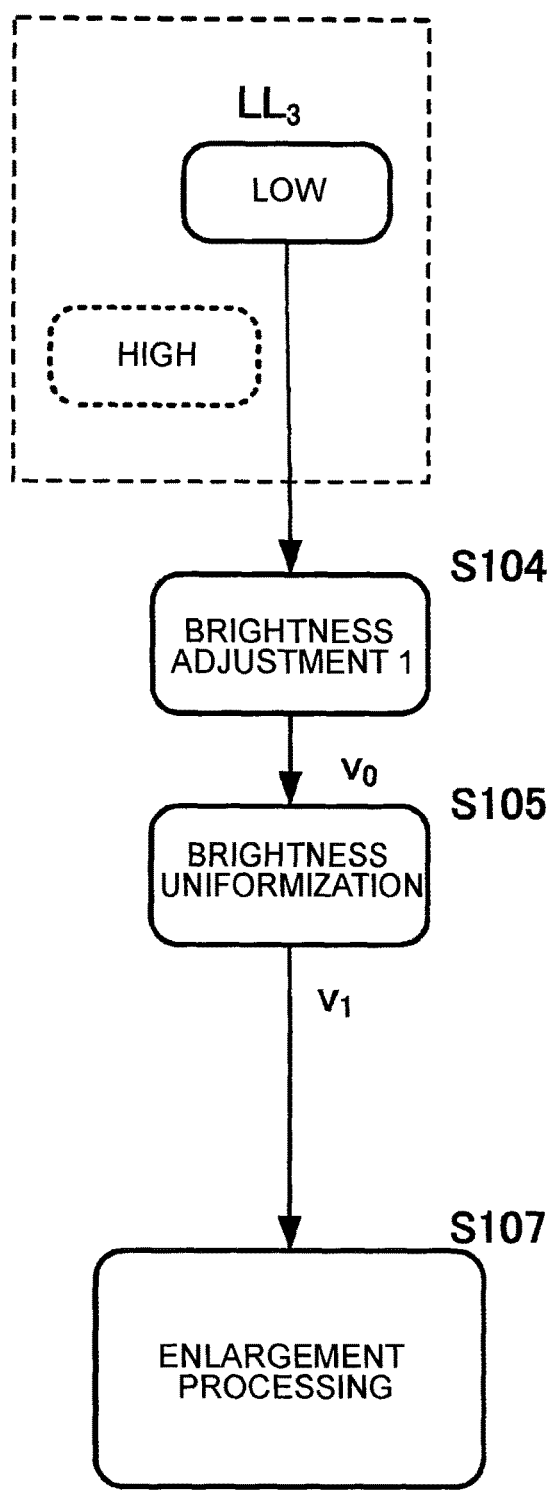
FIG. 10 is a flow chart illustrating operations from the discrete wavelet transform to enlargement processing in a second embodiment.

Next, a second embodiment of the image processing apparatus 10 is described with reference to FIG. 10 and FIG. 11. FIG. 10 is a flow chart illustrating operations from the discrete wavelet transform to the enlargement processing in the second embodiment, and FIG. 11 is a diagram illustrating corresponding relationships between kinds of embodiments and operations. In the second embodiment, configurations that are the same as those in the first embodiment are denoted with the same numerals, and explanations thereof are omitted, and configurations that are different from those in the first embodiment are mainly described.

In the first embodiment, as shown in FIG. 2, it is configured that the low-frequency component $LL_3$ is firstly extracted by the discrete wavelet transform (step S103), the brightness adjustment 1 is then performed so that the low-frequency component $LL_3$ becomes to the predetermined value $v_0$ (step S104), and the enlargement processing is performed (step S107) after performing the brightness uniformization by the filter 13 (step S105) and the brightness adjustment 2 (step S106) in that order.

In the second embodiment, as shown in FIG. 11, the one of the three processing including the brightness adjustment 1 (step S104), the brightness uniformization (step S105), and the brightness adjustment 2 (step S106) is omitted. Thereby, the image processing can be rapidly performed.

As shown in FIG. 10, the brightness adjustment 2 (step S106) is omitted in one mode. That is, it is configured that the brightness uniformization (step S105) is performed after performing the brightness adjustment 1 (step S104).

The brightness uniformization (step S105) is omitted in other mode. That is, it may be configured that the brightness adjustment 2 (step S106) is performed after performing the brightness adjustment 1 (step S104).

Further, the brightness adjustment 1 (step S104) is omitted in other mode. That is, as the order of the process, it may be configured that the brightness adjustment 2 (step S106) is performed after performing the brightness uniformization (step S105), or the brightness uniformization (step S105) is performed after performing the brightness adjustment 2 (step S106).

When each of the processing is terminated in those modes, the enlargement processing (steps S107, S108, and S109) is performed.

According to the second embodiment, even the high-frequency component structure and the low-frequency component structure are mixingly present, the brightness of the high-frequency component structure and the low-frequency component structure can be automatically adjusted to a level close to each other in real time, without changing any structures.

Third Embodiment

Figure 12:
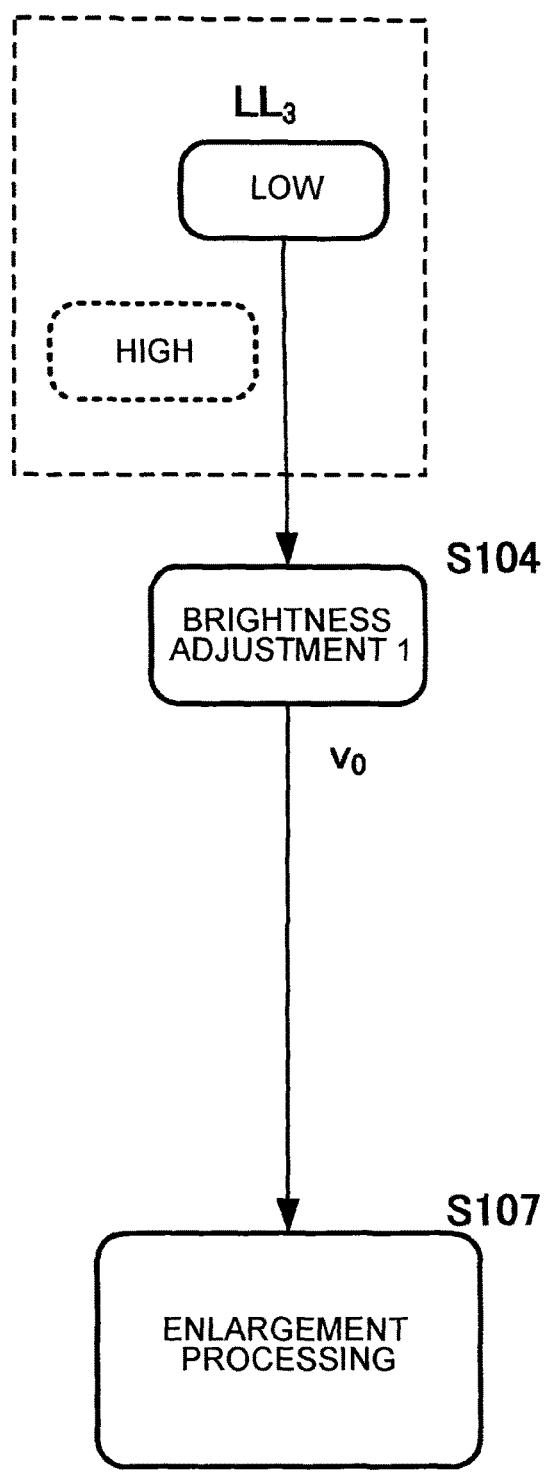
FIG. 12 is a flow chart illustrating operations from the discrete wavelet transform to the enlargement processing in a third embodiment.

Next, a third embodiment of the image processing apparatus 10 is described with reference to FIG. 11 and FIG. 12. FIG. 12 is a flow chart illustrating operations from the discrete wavelet transform to the enlargement processing in the third embodiment. In the third embodiment, configurations that are the same as those in the first embodiment are denoted with the same numerals, and explanations thereof are omitted, and configurations that are different from those in the first embodiment are mainly described.

In the third embodiment, as shown in FIG. 11, the two out of the three processing including the brightness adjustment 1 (step S104), the brightness uniformization (step S105), and the brightness adjustment 2 (step S106) are omitted. Thereby, the image processing can be rapidly performed.

As shown in FIG. 12, the brightness uniformization (step S105) and the brightness adjustment 2 (step S106) are omitted in one mode. That is, it may be configured that only the brightness adjustment 1 (step S104) is performed.

As shown in FIG. 11, the brightness adjustment 1 (step S104) and the brightness adjustment 2 (step S106) are omitted in other mode. That is, it may be configured that only the brightness uniformization (step S105) is performed. After performing the brightness uniformization (step S105), luminance change may be emphasized or weakened by multiplying an arbitrary factor. Emphasizing the luminance change can reduce low luminance noise.

Further, as shown in FIG. 11, the brightness adjustment 1 (step S104) and the brightness uniformization (step S105) are omitted in other mode. That is, it may be configured that only the brightness adjustment 2 (step S106) is performed.

When each of the processing is terminated in those modes, the enlargement processing (steps S107, S108, and S109) is performed.

According to the third embodiment, even the high-frequency component structure and the low-frequency component structure are mixingly present, the brightness of the high-frequency component structure and the low-frequency component structure can be automatically adjusted to a level close to each other in real time, without changing any structures.

Fourth Embodiment

Next, a fourth embodiment of the image processing apparatus 10 is described with reference to FIG. 1. In the fourth embodiment, configurations that are the same as those in the first embodiment are denoted with the same numerals, and explanations thereof are omitted, and configurations that are different from those in the first embodiment are mainly described.

In the forth embodiment, as shown in FIG. 1, it is configured that the value $v_1$ (the pixel values of the pixels arrayed in 8*8) calculated by the sfumato processing by the filter 13 is output to the system gain adjustment part 19. The system gain adjustment part 19 can optimizes the performance of the image processing apparatus 10 by performing the gain adjustment, based on the value $v_1$.

The gain adjustment by the system gain adjustment part 19 is performed based on the value $v_1$ (the pixel values of the pixels arrayed in 8*8), and it is therefore avoided that the calculation quantity from being huge.

[Ultrasonic Diagnosis Apparatus]

An ultrasonic diagnosis apparatus including the image processing apparatus 10 according to each of the above embodiments is now described.

As described above, the ultrasonic diagnosis apparatus includes an electro-acoustic transducer for irradiating ultrasonic pulses to the inside of the subject and the image processing apparatus 10. The ultrasonic echo which has been reflected to the body to return is converted to an electrical signal by the electro-acoustic transducer. The electrical signal is amplified. An image is constructed based on the amplified signal, and displayed on the display. As the images to be constructed, there are an ultrasonic b-mode image, an M-mode image, an image obtained by the pulse Doppler method, and an image obtained by the continuous wave Doppler method.

The ultrasonic b-mode image is an image of an acoustic echo intensity distribution of tissues in living body based on the time the echo signal is generated and the echo signal intensity. The M-mode image is an image displaying the luminance generated by the conversion of the echo intensity on the vertical axis, and the luminance displayed on the vertical axis in a time series manner on the horizontal axis. The image obtained by the pulse Doppler method is an image obtained by repeatedly irradiating the ultrasonic pulse to determine the velocity of moving tissues (blood flow) based on the frequency shift of the ultrasonic echo, and displaying the velocity direction moving toward the electro-acoustic transducer (oscillator) as a red component and contrary, the velocity direction moving backward as a blue component. The image obtained by the continuous wave Doppler method is an image obtained by continuously irradiating the acoustic pulse to determine the velocity of moving tissues (blood flow) after frequency-shifting the ultrasonic echo, and displayed with the velocity direction moving toward the electro-acoustic transducer (oscillator) in the red component and contrary, the velocity direction moving backward in the blue component.

The ultrasonic diagnosis apparatus includes the above-mentioned image processing apparatus 10. The ultrasonic diagnosis apparatus outputs at least one of the ultrasonic b-mode image, the M-mode image, the image obtained by the pulse Doppler method, and the image obtained by the continuous wave Doppler method to the image processing apparatus 10, as the original image g.

Further, any image obtained before a freeze operation is implemented by the ultrasonic diagnosis apparatus and/or any image obtained by the ultrasonic diagnosis apparatus in the past is output to the image processing apparatus 10, as the original image g.

Here, "freeze" refers to, when the ultrasonic b-mode image, or the like, is displayed, capture the image in static form in response to an operation by the user, for example. The image when it is frozen is stored in the storage 15 of the image processing 10 automatically or by the user's operation.

In each of the above embodiments, the original image g is decomposed into the low-frequency component $LL_1$, the high-frequency components $LH_1$, $HL_1$, and $HH_1$ with the discrete wavelet transform in the first hierarchical level, and the high-frequency components $LH_1$, $HL_1$, and $HH_1$ are used as the image $g^{(6)}$ for generating a restored image, but it is not limited thereto. It may be configured that the high-frequency components are used for generating a restored image without changing those components. Thereby, the test subject related information required for diagnosis will not be lost.

Further, in each of the above embodiments, it is configured that at least one of the three processing including the brightness adjustment 1 (step S104), the brightness uniformization (step S105), and the brightness adjustment 2 (step S106) is performed; however, the all of the processing may be omitted. Thereby, the image processing can be even more rapidly performed.

Further, in each of the above embodiments, it is described that the discrete wavelet transform is performed for the original image g as two-dimensional data; however, it may be configured that the transform is performed for the original image as three-dimensional data. The change of the configuration dose not affect the performance of the brightness adjustment on the original image in real time as same as for the two-dimensional data.

In each of the above embodiments, the image having the pixels arrayed in 8*8 of the lowest hierarchical level is generated by repeatedly performing the discrete wavelet transform for three hierarchical level times for the original image g having the pixels arrayed in 64*64, however, needless to say that the discrete wavelet transform is required to be repeatedly performed for four hierarchical level times in order to generate the image having the pixels arrayed in 4*4 of the lowest hierarchical level. Further, needless to say that the discrete wavelet transform is required to be repeatedly performed for four hierarchical level times or more for the original image g having the pixels arrayed in m*m (where m is the number of the pixels and m≥128) in order to generate image having the pixels arrayed in the r*r (where r is the number of the pixels and r≤8) of the lowest hierarchical level.

Furthermore, in each of the above embodiments, it is described that the original image g as the subject of the discrete wavelet transform is the data in which m pieces of the pixels are arrayed in the two-dimensional or three-dimensional directions; however, the original image may be row data in the data format before the coordinate transform.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of embodiments described herein may be made without departing from the spirit of the inventions. The accompanying claims and their equivalents are intended to cover such forms or modifications as would fall within the scope and spirit of the inventions.

What is claimed is:

1. An image processing apparatus, comprising processing circuitry configured to:
   repeatedly decompose a first image in which pixels thereof are arrayed in two-dimensional or three dimensional directions into high-frequency components and low-frequency components until the number of pixels becomes a predetermined number in each of the directions, and generate a second image based on the low-frequency components in a result of the last decomposition;
   uniformize the brightness of an entire area of the second image; and
   restore an image having the same number of pixels as that of the first image in each of the directions using the brightness uniformized second image, wherein
   the processing circuitry is further configured to generate a third image in which the same number of pixel values as that of the first image are arrayed in each of the directions based on the brightness uniformized second image, and the third image is used when the restored image is generated.

2. The image processing apparatus according claim 1, wherein
   a filter is configured to uniformize the brightness by setting each of the pixel values as the average value of the adjacent pixels thereto.

3. An ultrasonic diagnosis apparatus comprising the image processing apparatus according to claim 2, comprising:
   transmitting an ultrasonic wave to the test subject;
   receiving an ultrasonic echo reflected from the test subject;
   obtaining an image based on the ultrasonic echo; and
   outputting the obtained image to the image processing apparatus, as the first image.

4. The image processing apparatus according to claim 1, wherein the processing circuitry is further configured to
   perform gain adjustment upon reception of the brightness uniformized second image.

5. An ultrasonic diagnosis apparatus comprising the image processing apparatus according to claim 4, comprising:
   transmitting an ultrasonic wave to the test subject;
   receiving an ultrasonic echo reflected from the test subject;
   obtaining an image based on the ultrasonic echo; and
   outputting the obtained image to the image processing apparatus, as the first image.

6. The image processing apparatus according to claim 1, wherein
   the processing circuitry is further configured to be able to adjust changed pixel values.

7. The image processing apparatus according to claim 6, wherein
   a factor is stored in a storage in association with a user and/or a test subject,
   the adjustment of the changed pixel values is performed based on the factor associated with the user and/or the test subject.

8. An ultrasonic diagnosis apparatus comprising the image processing apparatus according to claim 7, comprising:
   transmitting an ultrasonic wave to the test subject;
   receiving an ultrasonic echo reflected from the test subject;
   obtaining an image based on the ultrasonic echo; and
   outputting the obtained image to the image processing apparatus, as the first image.

9. An ultrasonic diagnosis apparatus comprising the image processing apparatus according to claim 6, comprising:
   transmitting an ultrasonic wave to the test subject;
   receiving an ultrasonic echo reflected from the test subject;

obtaining an image based on the ultrasonic echo; and outputting the obtained image to the image processing apparatus, as the first image.

10. The image processing apparatus according to claim 1, wherein the processing circuitry is further configured to generate a fourth image in which the same number of pixel values as that of the first image are arrayed in each of the directions based on the image of the decomposed high-frequency components, and the fourth image is used in addition to the third image when the restored image is generated.

11. An ultrasonic diagnosis apparatus comprising the image processing apparatus according to claim 10, comprising:

transmitting an ultrasonic wave to the test subject;

receiving an ultrasonic echo reflected from the test subject;

obtaining an image based on the ultrasonic echo; and outputting the obtained image to the image processing apparatus, as the first image.

12. An ultrasonic diagnosis apparatus comprising the image processing apparatus according to claim 1, comprising:

transmitting an ultrasonic wave to the test subject;

receiving an ultrasonic echo reflected from the test subject;

obtaining an image based on the ultrasonic echo; and outputting the obtained image to the image processing apparatus, as the first image.

13. The ultrasonic diagnosis apparatus according to claim 12, wherein any image obtained before a freeze operation is implemented by the ultrasonic diagnosis apparatus and/or any image obtained by the ultrasonic diagnosis apparatus in the past is output to the image processing apparatus as the first image.

14. The ultrasonic diagnosis apparatus according to claim 12, wherein at least one of a M-mode image, a M-mode image reconfigured from an ultrasonic B-mode image, an image obtained by the pulse Doppler method, and an image obtained by the continuous wave Doppler method is output to the image processing apparatus as the first image.

* * * * *